(12) United States Patent
Löf (10) Patent No.: US 8,777,525 B2
(45) Date of Patent: Jul. 15, 2014

(54) POLYGONAL TURNING INSERT

(75) Inventor: Ronnie Löf, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 154 days.

(21) Appl. No.: 13/617,017

(22) Filed: Sep. 14, 2012

(65) Prior Publication Data

US 2013/0251468 A1 Sep. 26, 2013

(30) Foreign Application Priority Data

Sep. 23, 2011 (SE) ...................................... 1150869

(51) Int. Cl.
*B23B 27/22* (2006.01)
*B23B 27/00* (2006.01)

(52) U.S. Cl.
USPC .......................................... 407/114; 407/113

(58) Field of Classification Search
CPC .... B23B 27/14; B23B 27/143; B23B 27/145; B23B 27/1603; B23B 27/1607
USPC ........................... 407/113, 114, 115, 116, 117
See application file for complete search history.

(56) References Cited

U.S. PATENT DOCUMENTS

| | | | |
|---|---|---|---|
| 5,116,167 A | 5/1992 | Niebauer | |
| 5,372,463 A | 12/1994 | Takahashi et al. | |
| 5,743,681 A | 4/1998 | Winman et al. | |
| 6,123,488 A * | 9/2000 | Kasperik et al. | 407/113 |
| 7,121,772 B2 * | 10/2006 | Krahula et al. | 407/113 |
| 7,234,901 B2 * | 6/2007 | Ishida | 407/114 |
| 7,374,372 B2 | 5/2008 | Rofner et al. | |
| 7,976,251 B2 * | 7/2011 | Iyori et al. | 407/114 |
| 8,025,465 B2 * | 9/2011 | Ishida | 407/114 |
| 8,262,324 B2 * | 9/2012 | Park et al. | 407/113 |
| 8,434,975 B2 * | 5/2013 | Choi et al. | 407/114 |

FOREIGN PATENT DOCUMENTS

JP 2000-254807 9/2000

OTHER PUBLICATIONS

European Search Report for European Application No. 12184088.8, dated Jan. 3, 2013.

* cited by examiner

*Primary Examiner* — Will Fridie, Jr.
(74) *Attorney, Agent, or Firm* — Morgan, Lewis & Bockius LLP (57) ABSTRACT

Polygonal turning insert has a cutting edge including three part edges, a nose edge and two main edges, and chip-guiding flank surfaces for each part edge, a primary flank surface, and secondary flank surfaces. The primary flank surface is convexly arched and delimited by an arched lower boundary line, which has an apex point facing the nose edge and is situated along a bisector between the main edges, and includes two mirror-symmetrical arc part lines extending from the apex point to a pair of opposite end points situated along a reference line intersecting the bisector at a midpoint between the end points. The distance between the midpoint and the individual end points is greater than that between the midpoint and the apex point. An angle of inclination of the primary flank surface decreases from a greatest value in a bisector section to a smallest value in a reference line section.

14 Claims, 10 Drawing Sheets

POLYGONAL TURNING INSERT

RELATED APPLICATION DATA

This application is based on and claims priority under 37 U.S.C. §119 to Swedish Application No. 1150869-4, filed Sep. 23, 2011, the entire contents of which are incorporated herein by reference.

FIELD OF THE DISCLOSURE

The present disclosure relates to a polygonal turning insert of the type that comprises: an upper side generally parallel to a reference plane, an under side, and a plurality of clearance surfaces between the same; a cutting edge that is formed at least along the upper side and includes three part edges, viz. a nose edge situated in a corner and two main edges converging toward the same, which individually are formed between a chip surface and a clearance surface; as well as chip-guiding flank surfaces for each one of the part edges, viz. a primary flank surface situated behind the nose edge along a bisector between the main edges, and a pair of secondary flank surfaces situated inside the respective main edge, the individual flank surface leaning in the upward direction from a lower boundary line.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Figure 1:
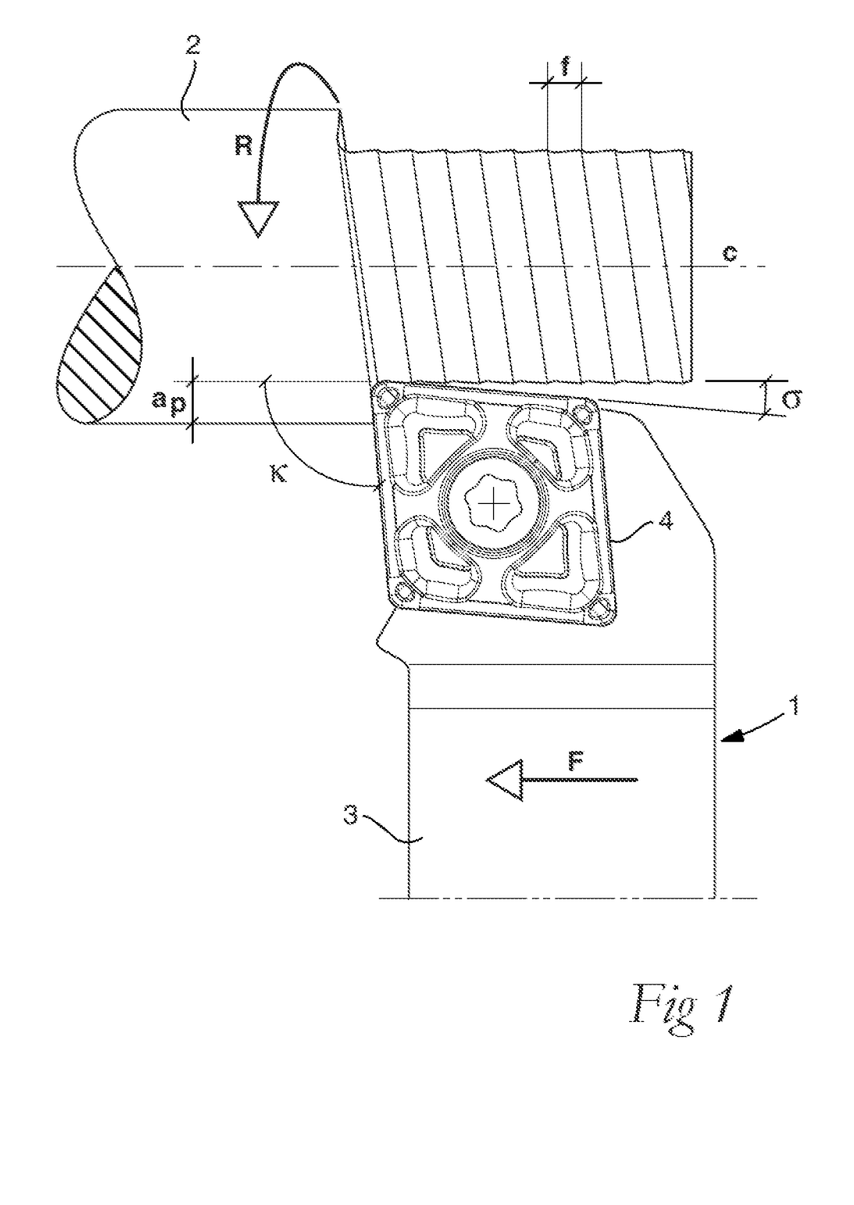
FIG. 1 shows a turning tool during conventional machining of a workpiece.
Figure 2:
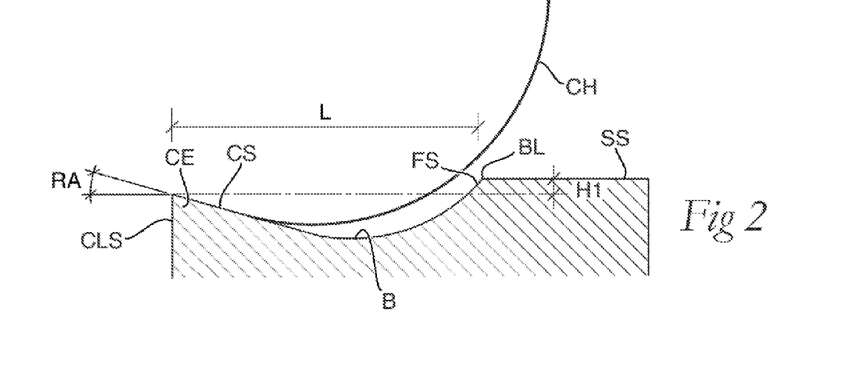
FIGS. 2-4 schematically illustrate different conditions for the guidance of the removed chip.
Figure 3:
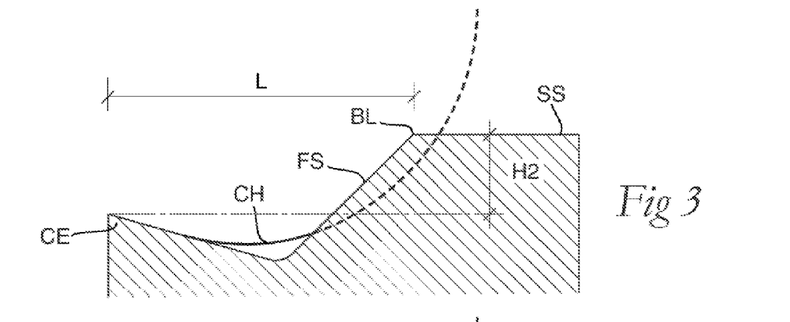
Figure 4:
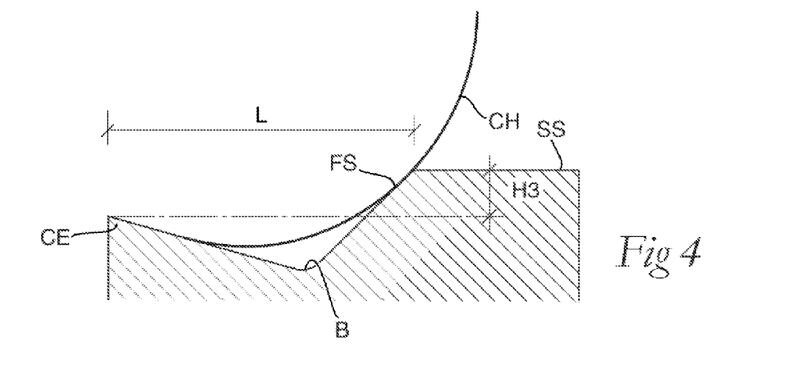

In order to facilitate the understanding of the invention, reference is made by way of introduction to accompanying FIGS. 1-4, FIG. 1 of which illustrates a turning tool during conventional machining of a workpiece, while FIGS. 2-4 schematically illustrate different conditions for the guidance of the removed chip.

In FIG. 1, a turning tool 1 is shown during machining of a workpiece 2. The tool 1 includes a holder 3 as well as a turning insert 4 (made in accordance with the invention). In this case, the workpiece 2 is rotated (in the direction of rotation R) at the same time as the tool 1 is longitudinally fed parallel to the centre axis C of the workpiece, more precisely in the direction of arrow F. The longitudinal feed per revolution is designated f, while the cutting depth is designated $a_p$. The setting angle between the direction of the longitudinal feed and a main edge included in the turning insert is designated κ. In the example shown, κ amounts to 95°. It should furthermore be pointed out that the turning insert 4 has a rhombic basic shape and comprises two acute-angled corners having an angle of 80° and two obtuse-angled ones having an angle of 100°. In such a way, a clearance angle σ of 5° is obtained between the turning insert and the generated surface of the workpiece.

In FIGS. 2-4, CE designates a cutting edge that has a positive cutting geometry and is delimited between a chip surface CS and a clearance surface CLS. The surfaces CS and CLS meet each other at an acute angle, and therefore the rake angle RA of the cutting edge becomes smaller than 90°. In the example, RA amounts to approximately 15°. An upper side SS useful as a bearing surface transforms, via a boundary line BL, into a flank surface FS, which leans downward toward a bottom B, which forms a transition to the chip surface CS. The distance between the boundary line BL and the cutting edge line of the cutting edge CE is designated L. A chip removed by the cutting edge CE is illustrated schematically in the form of an arc line CH.

In all kinds of chip removing machining of metal, including turning, the rule applies that the chip is born "crooked", i.e., immediately after the moment of removal, the chip obtains an inherent aim to be curved. The shape of the chip, among other things its radius of curvature thereof, is determined by several factors, the most important of which in connection with turning are the feeding of the tool, the rake angle of the cutting edge, and the cutting depth in question. After the removal, the chip will move perpendicularly to each infinitesimal part of the cutting edge. If the cutting edge is straight, the chip therefore becomes cross-sectionally flat or rectangular, but if the same is entirely or partly arched, also the chip becomes cross-sectionally entirely or partly arched.

In FIG. 2, it is shown how the chip CH is formed without hitting the flank surface FS. This means that the chip is developed in an uncontrolled way without being guided at all. Such a chip most often curls into a long, telephone cord-like screw formation, which among other things may hit the generated surface of the workpiece, get entangled in the tool and/or the machine, and at times even be a risk of damage to the surroundings. In the example according to FIG. 2, the level difference H1 between the bearing surface SS and the cutting edge CE—or the height of the flank surface FS above the cutting edge CE—in relation to the distance L is too small for the chip to contact the flank surface FS. It may also be said that the flank surface FS is situated at too great a distance from the cutting edge CE to be hit by the chip having the radius of curvature in question.

In FIG. 3, a turning insert is shown, in which the level difference H2 between the bearing surface SS and the cutting edge CE (=the height of the flank surface) is considerably greater than in the preceding example, the flank surface FS sloping fairly steeply down toward the transition B to the chip surface CS. This means that the chip CH will dive into the flank surface FS with a great force, more precisely in a lower area of the same. The result of this will be that great amounts of heat are developed in the contact area, at the same time as the turning insert becomes blunt-cutting. In addition, the material of the chip may easily stick to the flank surface FS, even all the way up to the bearing surface SS. After a certain time of use, also wear damage in the flank surface arises. Therefore, the embodiment according to FIG. 3 does not provide good chip control.

In FIG. 4, an embodiment is shown in which the conditions for a good chip control are considerably improved. In this case, the height of the flank surface, i.e., the level difference H3 between the bearing surface SS and the cutting edge CE, is selected in such a way that the chip CH will carefully meet the flank surface FS in an upper area closest to the bearing surface SS. In such a way, the generation of heat and the tendencies to sticking are reduced, whereby the easy-cutting properties of the turning insert are maintained. Not only the fact that the chip hits the flank surface FS by a moderate force, but also the fact that the distance between the cutting edge CE and the point of impact of the chip against the flank surface FS is greater than in FIG. 3 contributes to the moderate heat generation, whereby the temperature in the hot chip will have time to decrease further. When the level difference between the bearing surface SS and the cutting edge CE is selected in an optimal way, as shown in FIG. 4, good chip control is accordingly created.

A great difference between a cutting edge having a positive cutting geometry according to the above and a cutting edge having a negative cutting geometry is that the first-mentioned one lifts out the chip by being wedged in between the same and the generated surface, while the last-mentioned one pushes the chip in front of itself while shearing off the same. Generally, positive cutting edges will therefore be more easy-cutting than negative ones and produce chips having greater radii of curvature than the last-mentioned ones.

Within the field of turning, it is often desirable to be able to use one and the same turning insert for rough, medium and fine turning, while attaining good chip control irrespective of the cutting depth in question. For this reason, a number of different turning inserts of the type initially mentioned have been developed, i.e., turning inserts that include a primary chip-guiding flank surface situated behind the individual nose edge as well as two secondary flank surfaces situated inside the two main edges that converge into the nose edge. Examples of such turning inserts are documented in U.S. Pat. No. 5,372,463, U.S. Pat. No. 5,743,681, and U.S. Pat. No. 7,374,372.

In spite of all development attempts, however, the previously known turning inserts have mediocre versatility in respect of the ability to provide good chip control under all the varying operation conditions possible. Accordingly, certain turning inserts may give acceptable results when the cutting depth is small and the feed moderate (=thin chip), but poor results when the cutting depth as well as the feed are increased (=thicker chip). Other turning inserts are suitable for rough turning at large cutting depths and large feed, but not for fine turning. This lack of versatility becomes particularly annoying when the cutting depth varies during one and the same working operation.

In the turning insert according to U.S. Pat. No. 5,372,463, the primary flank surface is included in an utmost narrow, elongate tongue, which extends along the bisector between two main edges. The smallness of the primary flank surface means that thin chips at small cutting depths risk passing the flank surface without hitting the same. The turning insert according to U.S. Pat. No. 5,743,681 includes a primary flank surface, which per se is sufficiently wide for the chip to hit the same with certainty. With the purpose of further improving this certainty, the flank surface is made with a concave shape. However, as soon as the cutting depth becomes considerably greater than the radius of the nose (=increasing chip width), one of the ends of the primary flank surface will disturb the chip formation by partially applying forces to the chip, which tends to deform the same too abruptly. Nor does the turning insert according to U.S. Pat. No. 5,372,463, which is based on the use of a bean-like knob behind the nose edge, provide universally good chip control. Even if a thin and slender chip perchance would be captured in the central groove running in the length extension of the knob, the rather high side surfaces of the knob will disturb the chip formation as soon as the cutting depth increases.

SUMMARY

The present invention aims at obviating the above-mentioned shortcomings of previously known turning inserts, and at providing an improved turning insert. Accordingly, a primary object is to provide a turning insert that provides good chip control not only in fine turning at minimal cutting depths, but also in all other, possibly varying cutting depths up to the maximal limit. In particular, the chip should be possible to be guided in a careful way even if the same during one and the same machining operation would vary in width. A further object is to provide a turning insert that can be manufactured in a simple and inexpensive way, not only in single-sided designs but also double-sided ones.

Accordingly, at least the primary object is achieved by the primary flank surface being convexly arched and delimited by an arched lower boundary line, which has an apex point facing the nose edge and being situated along the bisector and includes two mirror-symmetrical arc part lines, which extend from the apex point to a pair of opposite end points situated along a straight reference line that intersects the bisector at a right angle in a middle point between the end points, the distance between the midpoint and the individual end point being greater than the distance between the midpoint and the apex point, besides which the angle of inclination of the primary flank surface in arbitrary vertical sections through the midpoint decreases from a greatest value in a section along the bisector to a smallest value in a section through the individual end point. By this design of the primary flank surface, a good chip control is achieved not only for such thin chips that are obtained in fine turning, but also for wider chips that are obtained at greater cutting depths. Accordingly, the primary flank surface affords a good chip control for slender and easily bent chips without the same impairing or disturbing the chip control, when the width and stiffness of the chip increase.

In one embodiment, the greatest angle of inclination of the primary flank surface is at least twice as large as the smallest one. In practice, the greatest angle of inclination should not exceed 50°, because otherwise the contact of the chip with the flank surface will be too hard and abrupt. On the other hand, the smallest angle should not be less than 5°. Namely, if the smallest angle would be smaller, the chip-guiding effect of the flank surface would be deteriorated or lost.

In another embodiment—when the turning insert is invertible—the primary flank surface is formed on a solitary knob, which is separated from a land behind, in which the secondary flank surfaces are included. An advantage of this embodiment is that the knob can be worn during operation without causing sticking of metal on a plane support surface included in the land behind. When the turning insert is inverted, the support surface retains its flatness and therefore provides a stable support of the turning insert. Furthermore, the formation of the primary flank surface on a solitary knob simplifies the pressing of the turning insert, when the turning insert is made from cemented carbide.

When the primary flank surface is formed on a solitary knob, it is suggested that the knob is given an oval, calotte-like shape, more precisely by delimiting the same not only by means of a primary flank surface facing forward toward the nose edge, but also by a convexly arched back side. In such a way, the knob also resists wear caused by comparatively wide chips, which simultaneously hit, and are guided by, the knob as well as a secondary flank surface on the land behind.

The extension of the oval, elongate knob between opposite end points may advantageously be at least 30% greater than its extension along the bisector. In such a way, the primary flank surface will in a reliable way be hit by thin and slender chips even if the chip flow direction would deviate from the bisector.

In a preferred embodiment, the knob is situated under an imaginary plane, in which the cutting edge line of the turning insert is located. In such a way, exaggerated heat generation and sticking of material on the knob are counteracted, at the same time as noise is avoided.

In a further embodiment, which is exemplified in the drawings, a rake angle between the chip surface and a reference plane parallel to the upper side decreases successively from a greatest value along the bisector to a smallest value in a section along the transverse reference line. In this connection, an obtuse valley angle between the primary flank surface and the surrounding chip surface increases from a smallest value in a section along the bisector to a greatest value in a section along said reference line, more precisely proportionally more than only by the increase caused by the successive decrease of the angle of inclination of the primary flank surface. In such a way, the ability of the turning insert to distinctly guide thin and slender chips (=minimal cutting depth) is optimally combined with the ability to guide wider chips (=greater cutting depth) in a careful way.

An exemplary embodiment of a polygonal turning insert comprises an upper side generally parallel to a reference plane, an under side, a plurality of clearance surfaces between the upper side and the under side; a cutting edge that is formed at least along the upper side and includes three part edges, wherein the three part edges include a nose edge situated in a corner of the insert and two main edges converging toward the corner, which individually are formed between a chip surface and a clearance surface; and a chip-guiding flank surface for each one of the part edges, wherein the chip-guiding flank surface includes a primary flank surface situated behind the nose edge along a bisector between the main edges and a pair of secondary flank surfaces situated inside the respective main edge, wherein the primary flank surface and the secondary flank surfaces lean in an upward direction from a lower boundary line, wherein the primary flank surface is convexly arched and delimited by an arched lower boundary line, which has an apex point facing the nose edge and is situated along the bisector and includes two mirror-symmetrical arc part lines, which extend from the apex point to a pair of opposite end points situated along a straight reference line that intersects the bisector at a right angle in a middle point between the end points, wherein a first distance between the midpoint and the individual end points is greater than a second distance between the midpoint and the apex point, and wherein an angle of inclination of the primary flank surface in arbitrary vertical sections through the midpoint decreases from a greatest value in a section along the bisector to a smallest value in a section through the individual end points.

BRIEF DESCRIPTION OF THE DRAWING

The following detailed description of preferred embodiments can be read in connection with the accompanying drawings in which like numerals designate like elements and in which.

DETAILED DESCRIPTION

Before the invention is described in more detail, attention should be paid to a metaphor that at times is used by those skilled in the art to make clear the fact that chips having different width/thickness have different bendability. Accordingly, a thin and slender chip may be compared to a weak blade of grass, while a thick chip may be compared to a stiff reed. Similar to the blade of grass, the thin chip can without substantial difficulty be bent if the same is brought toward an obstacle in the form of an adjacent, steeply sloping flank surface, while a thick, reed-like chip would be broken over; this is something which gives a high sound level, great cutting forces, a short service life, as well as high heat generation with the ensuing sticking.

Figure 5:
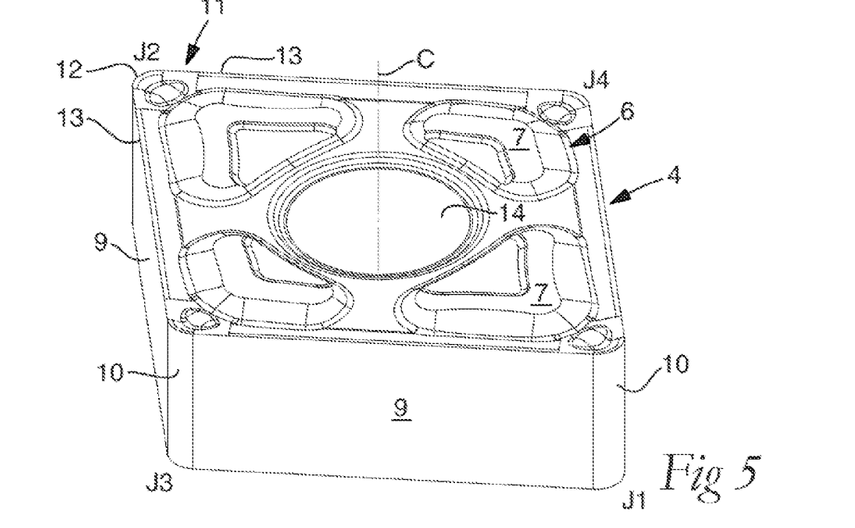
FIG. 5 is a perspective view of a turning insert according to one embodiment of the invention.
Figure 6:
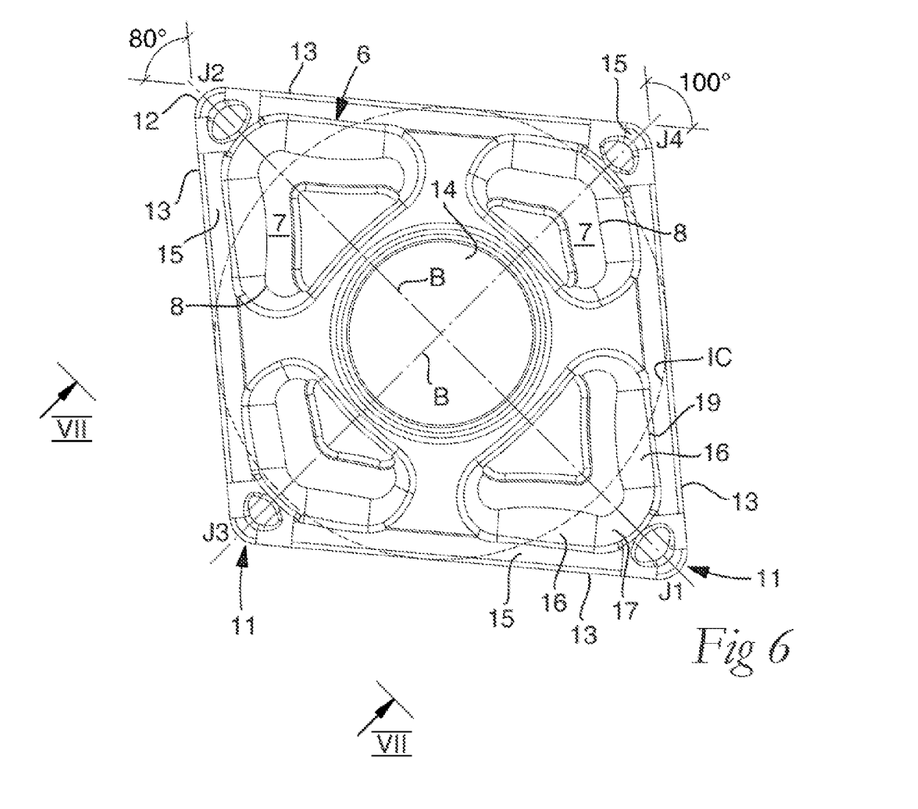
FIG. 6 is a planar view from above of the turning insert according to FIG. 5.
Figure 7:
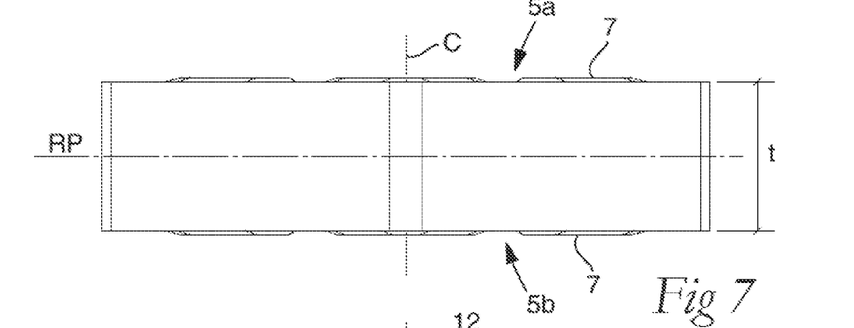
FIG. 7 is a side view of the turning insert according to FIG. 5.
Figure 8:
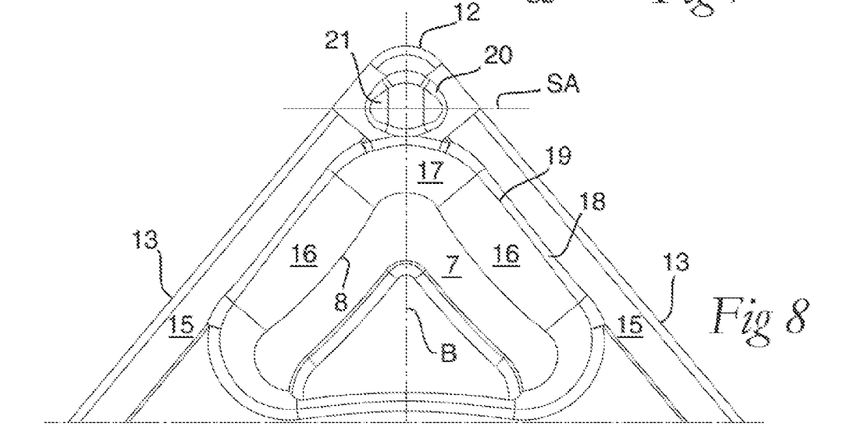
FIG. 8 is an enlarged detailed view of a pointed corner of the turning insert as viewed from above.

Reference is now made to FIGS. 5-7, in which it is seen that the turning insert 4 has a polygonal basic shape and comprises an upper side 5a and an under side 5b. In the shown, preferred embodiment, the turning insert is double-sided so far that the upper and under sides are identical. For this reason, henceforth only the upper side 5a will be described in detail.

In the upper side 5a, a plurality of, more precisely four, lands 6 are included, which individually include a plane surface 7, which serves as support surface when the turning insert is turned upside down and is applied in a seat of the tool holder 3 (see FIG. 1). The four support surfaces 7 are situated in a common plane, the upper and under sides 5a, 5b, such as the same are defined by the plane of the support surfaces, being parallel to each other as well as to a reference plane RP (see FIG. 7), which in this case forms a neutral plane halfway between the upper and under sides. The individual support surface 7 has a V-shaped contour shape and is delimited by an endless boundary line 8.

In the example, the turning insert is rhombic and includes four corners J1, J2, J3 and J4, which are pair-wise opposite each other. At the corners J1, J2, the turning insert is acute-angled, while the corners J3, J4 are obtuse-angled. Although the corner angles may vary, in this case, the acute angles are 80° and the obtuse angles 100°. Between the upper and under sides 5a, 5b, a circumferential clearance surface extends, which includes a plurality of part surfaces, viz. four plane part surfaces 9, which individually run between a pair of corners, as well as four convex part surfaces 10, which are situated in the corners and form transitions between the adjacent, plane clearance part surfaces 9. In FIG. 6, B designates imaginary bisectors between the corners J1, J2 and J3, J4, respectively. An inscribed circle of the type that traditionally is used to size classify turning inserts is designated IC. In practice, the IC measure of the turning insert in question may fall within the range of 6-25 mm. The thickness t of the turning insert (see FIG. 7), such as this is defined as the distance between the planes of the opposite support surfaces 7, is in practice less than half of the IC measure of the turning insert.

Along the individual upper side and under side, respectively, four cutting edges are formed, which are generally designated 11 and each one of which includes three part edges, viz. a nose edge 12 and two main edges 13 converging toward the same. The principal chip removal, at least at considerable cutting depths, is provided for by the individual main edge 13, while the mutual nose edge 12 has the purpose of operating at small cutting depths and wiping off the generated surface regardless of which one of the two main edges that is active. When the turning insert is used in one and the same tool holder 3 (see FIG. 1), only the cutting edges at the acute-angled corners J1, J2 are utilized.

In FIGS. 5-7, it is furthermore seen that the turning insert includes a central, through hole 14, the geometrical centre axis of which is designated C. It is axiomatic that the two corners J1 and J2 are equidistantly separated from the centre axis. Also the radial distances between the centre axis C and the two corners J3, J4 are equally large, although smaller than the distances to the corners J1, J2.

Immediately inside the circumferential clearance surface, which includes the clearance part surfaces 9, 10, a circumferential chip surface generally designated 15 is running. In the usual way, the part edges 12, 13 of the cutting edge are delimited between on one hand the chip surface 15 and on the other hand the clearance part surfaces 9, 10 (a cutting edge line and possibly a reinforcement bevel forming a transition between the surfaces). The individual land 6 is formed with a pair of flank surfaces 16, which are running approximately parallel to the two straight main edges 13. These flank surfaces 16 transform into a common breast surface 17. The flank surfaces 16 as well as the breast surface 17 transform into the surrounding chip surface 15 via so-called radius transitions, i.e., concavely arched surface portions, which form a chute-like bottom 18 (see also FIG. 12). The flank surfaces 16 as well as the breast surface 17 slope downward from the upper boundary line 8, which delimits the support surface 7, to a lower boundary line 19, where said surfaces transform into the radius transition or the chute bottom 18.

Between the nose edge 12 and the land 6 behind, there is, in the shown, preferred embodiment, formed a solitary knob 20, in which a flank surface 21 is included that is facing forward toward the nose edge 12. In order to separate the different flank surfaces, the surface 21 is henceforth denominated "primary flank surface", while the flank surfaces 16 are denominated "secondary flank surfaces". In the example shown, when the knob 20 is separated from the land 6, the breast surface 17 forms a "tertiary flank surface".

The present invention is based on a unique shape of the primary flank surface 21, which in this case is included in the knob 20. In order to in detail explain the design of said flank surface 21, reference is now made to FIGS. 10-15.

Figure 9:
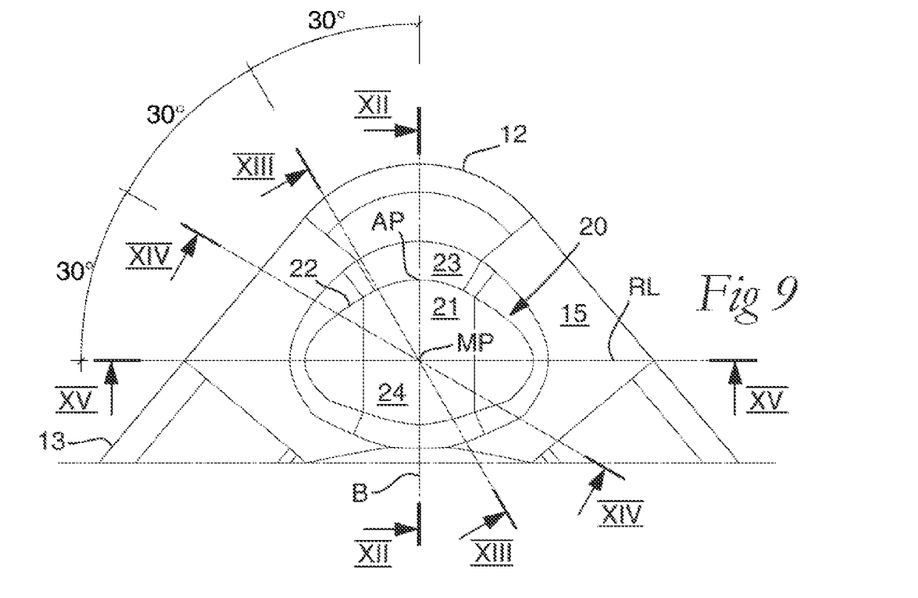
FIG. 9 is a detailed view showing a knob included in the nose of the turning insert, on a further enlarged scale.
Figure 10:
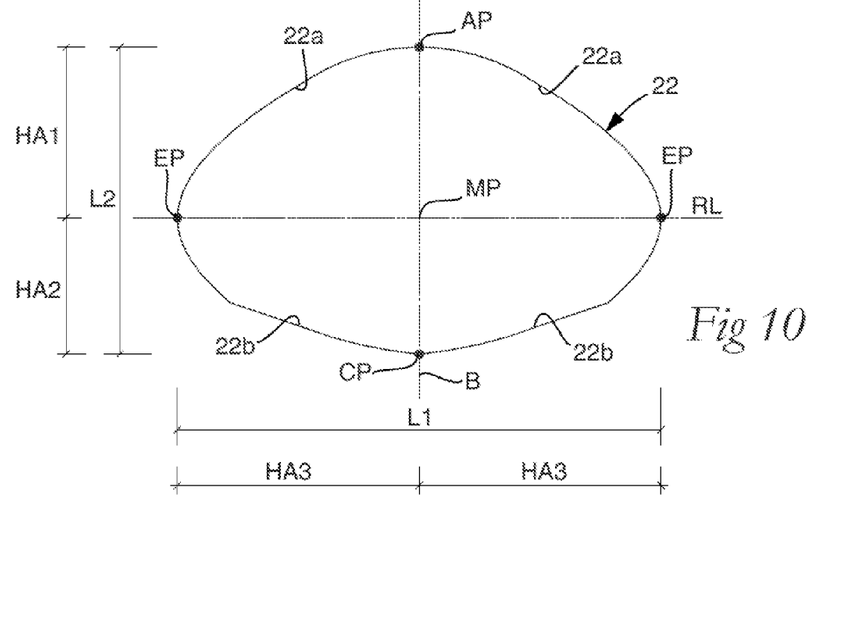
FIG. 10 is a schematic planar view showing geometrical data of solely the proper knob.

As is seen in FIGS. 9 and 10, the knob 20 is delimited by a lower, endless boundary line 22, along which the same transforms into a surrounding chute or radius transition 23, which in turn partly is surrounded by the part of the chip surface 15 that is present closest to the nose edge 12. The knob 20 is as a whole calotte-like, which means that not only the primary flank surface 21 but also a back side 24 of the same obtains a convexly arched shape. As viewed alone in plane elevation (FIG. 10), the knob has an oval, ellipse-like (although not genuinely elliptical) contour shape. More precisely, the oval boundary line 22 has an apex point AP that faces forward toward the nose edge and is situated along the bisector B. From the apex point AP, two mirror-symmetrical arc part lines 22a extend up to two opposite end points EP. These end points EP are situated along a reference line RL that intersects the bisector B at a right angle, more precisely at a point MP that is situated halfway between the end points EP. In other words, the elongate knob—and thereby the primary flank surface 21—is transverse in relation to the bisector B.

Like the front, primary flank surface 21, the back side 24 of the knob is delimited by two arc part lines 22b. These extend from the end points EP to a common point of intersection CP situated along the bisector B. It should be noticed that the knob has its greatest length extension L1 between the end points EP and its smallest extension L2 between the apex point AP and the point of intersection CP. Furthermore, it should be noted that the primary flank surface 21 has a rise HA1 (=the distance between AP and MP) that is greater than the rise HA2 of the arc line that delimits the back side 24. This means that the profile shape of the knob is on one hand unsymmetrical in relation to the reference line RL, but on the other hand mirror-symmetrical in respect of the bisector B, in that the distances HA3 from the midpoint MP to the end points EP are equally large.

Like the forwardly facing flank surface 21 of the knob, the back side 24 thereof may be arched and formed so that infinitesimal angles of inclination decrease from a greatest value along the bisector B to a smallest value along the above-mentioned reference line RL.

Figure 11:
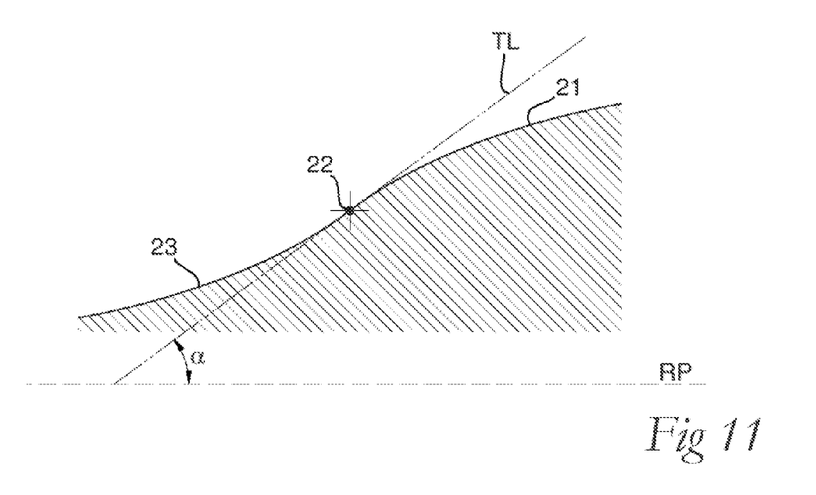
FIG. 11 is a further enlarged section having the purpose of defining an angle α between a primary flank surface included in the knob and a reference plane.

In order to make clear the topographic shape or calotte-shape of the knob, reference is made first to FIG. 11 and then to FIGS. 12-15. In FIG. 11, it is generally shown how the convex flank surface 21 transforms into the concave radius transition 23 via the boundary line 22. A line TL, along which the boundary line 22 is situated, forms a tangent that is common to the convex surface as well as to the concave one. This tangent TL forms an angle $\alpha$ with the aforementioned reference plane RP. As will be evident from FIGS. 12-15, the angle $\alpha$ defines the inclination of the primary flank surface 21 in different sections through the knob.

In FIG. 9, there are inserted four vertical sections that have an even pitch of 30° and intersect the midpoint MP of the knob 20, more precisely a first section XII-XII along the bisector B, two intermediate sections XIII-XIII and XIV-XIV, as well as a fourth section XV-XV along the reference line RL. As is seen by a comparison between FIGS. 12-15, the angle of inclination of the primary flank surface 21 has a greatest value $\alpha_1$ in the section XII-XII so as to successively decrease to a smallest value $\alpha_4$ in the section XV-XV. In the concrete example, $\alpha_1$ amounts to 44°, $\alpha_2$ to 41°, $\alpha_3$ to 31°, and $\alpha_4$ to 17°.

In FIGS. 12-15, $\gamma$ designates a rake angle, which defines the inclination of the chip surface 15 in relation to an imaginary reference plane $RP_0$, which is parallel to the reference plane RP and in which the cutting edge line of the cutting edge 11 is situated. Between the chip surface 15 and the primary flank surface 21, an obtuse angle $\beta$ is formed, which henceforth is denominated valley angle. Already as a consequence of the fact that the flank angle $\alpha$ decreases from a greatest value $\alpha_1$ to a smallest one $\alpha_4$, said valley angle will increase from a smallest value $\beta_1$ along the bisector B to a greatest value $\beta_4$ along the reference line RL. Such an increase of the valley angle would be obtained even if the rake angle $\gamma$ would be constant along the cutting edge. However, as is seen in FIGS. 12-15, also the rake angle $\gamma$ decreases successively from a greatest value in the section XII-XII to a smallest value in the section XV-XV. In the example, $\gamma_1$ amounts to 18.2°, $\gamma_2$ to 17.7°, $\gamma_3$ to 15.3°, and $\gamma_4$ to 8.5°. By this successive decrease of the rake angle $\gamma$, the increase of the obtuse valley angle $\beta$ is accentuated. In other words, the valley angle $\beta$ increases proportionally more than only by the increase caused by the successive decrease of the angle of inclination $\alpha$ of the primary flank surface. Accordingly, in the example, $\beta_1$ amounts to approximately 118°, $\beta_2$ to 121°, $\beta_3$ to 134°, and $\beta_4$ to 155°.

Figure 12:
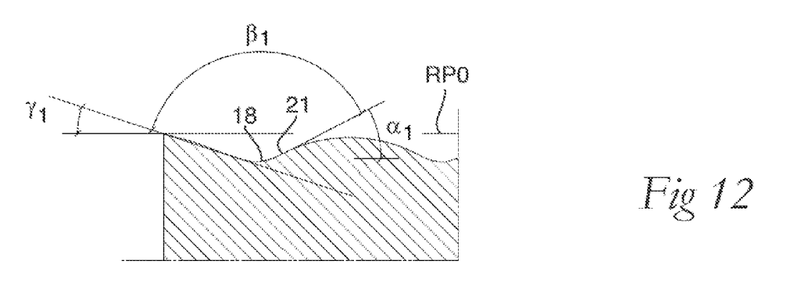
FIGS. 12-15 are four different sections XII-XII, XIII-XIII, XIV-XIV, XV-XV, as annotated in FIG. 9.
Figure 13:
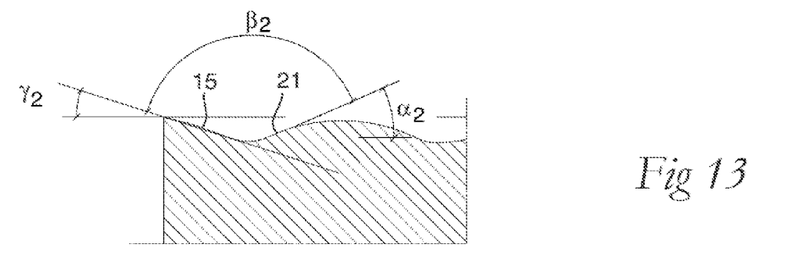
Figure 14:
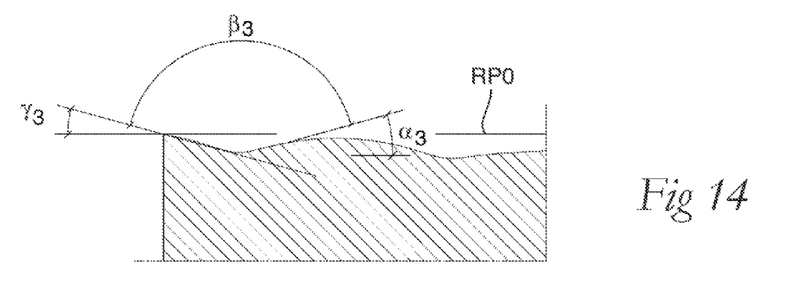
Figure 15:
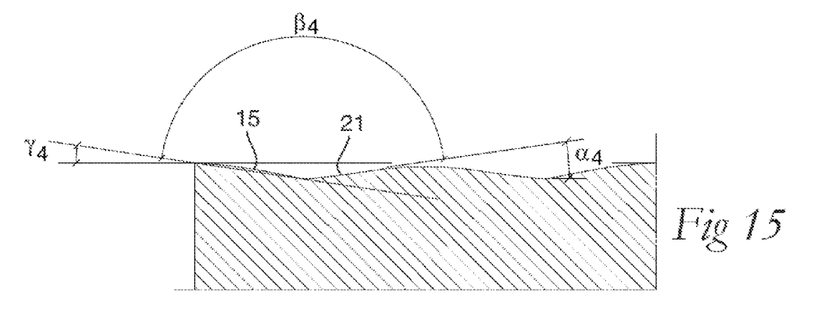

Expressed in words, the primary flank surface 21 may be said to have its steepest inclination in the section XII-XII, i.e., immediately behind the nose edge 12, after which the same becomes flatter and flatter up to the section XV-XV. In the last-mentioned section, not only the flank surface 21, but also the chip surface 15 is flattest, i.e., leans minimally. The V-shape of the valley, such as this is defined by the angle β, is accordingly fairly deep immediately behind the nose edge 12 so as to after that successively become shallower and shallower toward the section XV-XV.

In FIGS. 12-15, it is furthermore seen that the calotte-shaped knob 20 is entirely situated below the plane $RP_0$, in which the cutting edge line of the turning insert is located. In this connection, reference is made also to FIG. 7, in which it is seen that the plane support surfaces 7 of the lands 6 are situated somewhat above the cutting edge line of the turning insert. This means that the level difference between the support surfaces 7 and the highest point or top of the knobs 20 is even greater than the level difference between the plane $RP_0$ and the highest point of the knob. By lowering the top of the knob below the plane $RP_0$, on one hand heat generation with the ensuing sticking of metal on the knob, and on the other hand disturbing noise during the turning operation are counteracted.

In practice, the above-mentioned flank angles $\alpha_1$-$\alpha_4$ may vary within fairly wide limits. However, the greatest flank angle $\alpha_1$ should be at least twice, and at most ten times, as large as the smallest one $\alpha_4$, wherein the greatest angle $\alpha_1$ should not exceed 50°. Neither should the smallest flank angle $\alpha_4$ be less than 5°. Advantageously, $\alpha_1$ is 5-8 times greater than $\alpha_4$.

The concept "convexly arched", such as this is used in this description and the subsequent claims, relates primarily to the lateral curvature of the primary flank surface, i.e., so far that arbitrary generatrices, imaginarily considered along the surface and parallel to the lower boundary line 22, are arched. However, generatrices drawn from the lower boundary line toward the top of the knob may be either arched or straight. As may be best seen in FIG. 11, the flank surface 21 is, in the exemplified embodiment, arched in two co-ordinate directions by the fact that just generatrices from the boundary line 22 and upward are arched. Within the scope of the invention, the flank surface 21 may also be cone-like with straight generatrices drawn upward from the lower boundary line 22. In the last-mentioned case, the top of the knob may be a plane surface like a truncated cone, and not a calotte-shaped top, as shown in the example.

It should also be mentioned that the valley angle (not shown) in a section along the individual secondary flank surface 16 differs just very little from the valley angle $\beta_4$ (see FIG. 15). Accordingly, in the example, the angle of inclination of the flank surface 16 amounts to approximately 17° at the same time as the rake angle in the same section amounts to 10°. This means that the valley angle inside the individual main edge amounts to 153° (to be compared with 155° in the section XV-XV).

Figure 16:
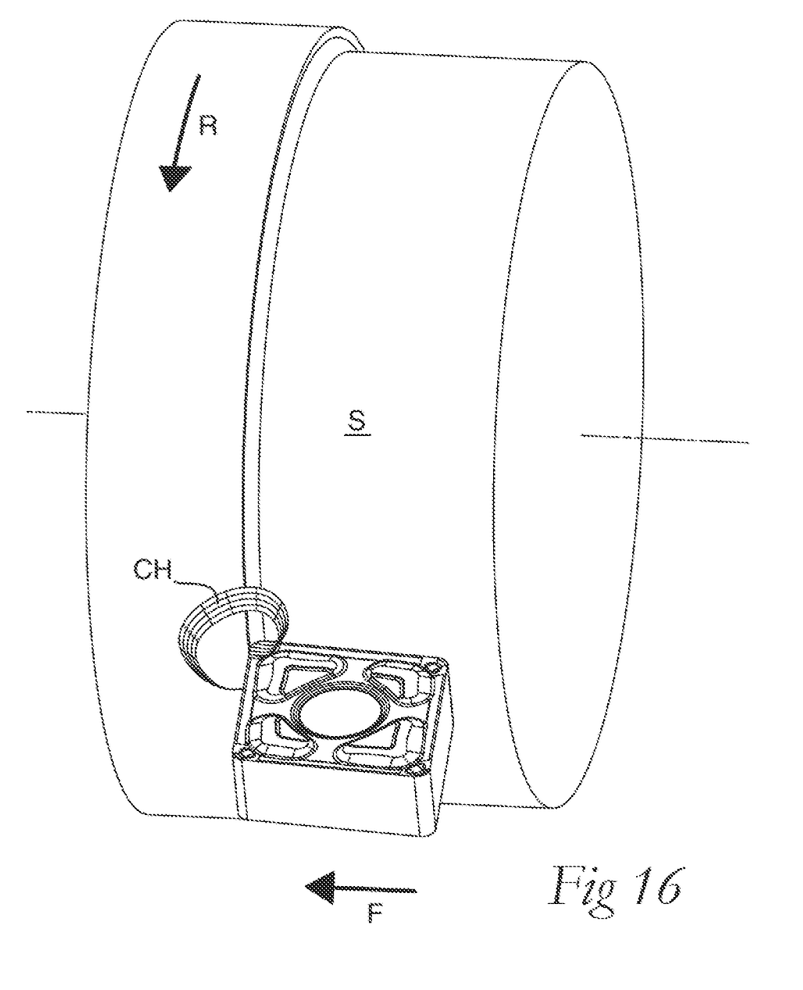
FIG. 16 is a perspective view showing the turning insert during machining of a rotating workpiece.

Reference is now made to FIGS. 16-22, which in partial perspective views illustrate three different cases of turning, viz. fine turning, medium turning and rough turning by means of the turning insert according to the invention. In FIG. 16, the turning insert 4 is generally shown during turning of the workpiece 2, which is rotated in the direction of rotation R at the same time as the appurtenant tool (see FIG. 1), in which the turning insert is mounted, is longitudinally fed in the direction of arrow F. In this connection, a chip CH is removed while generating a smooth, machined surface S having a cylindrical shape.

Figure 17:
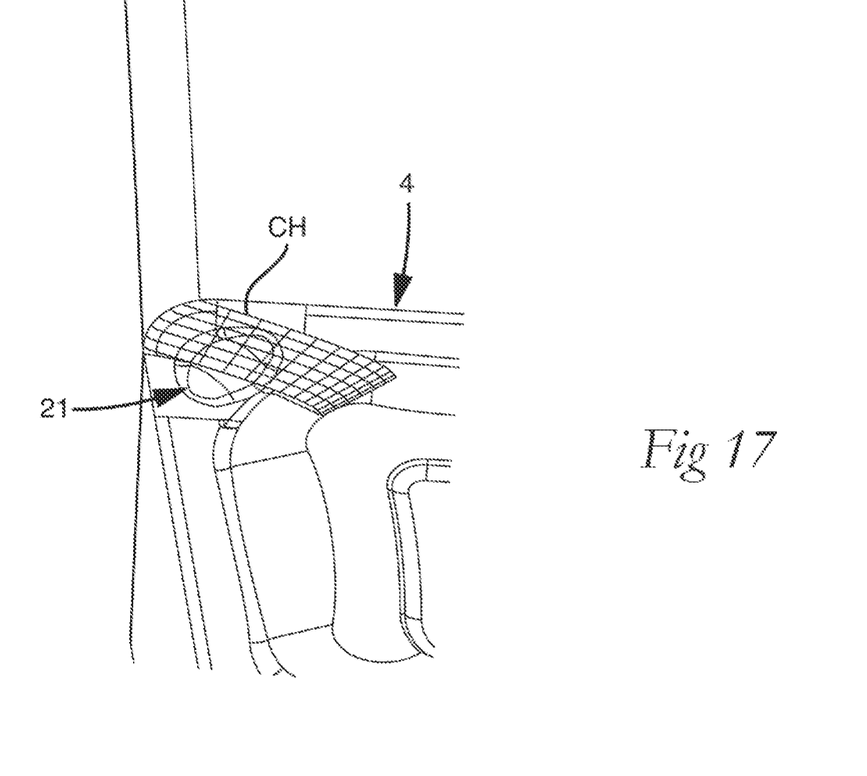
FIG. 17 is an enlarged, perspective detailed view showing a chip that is formed when the cutting depth is small.
Figure 18:
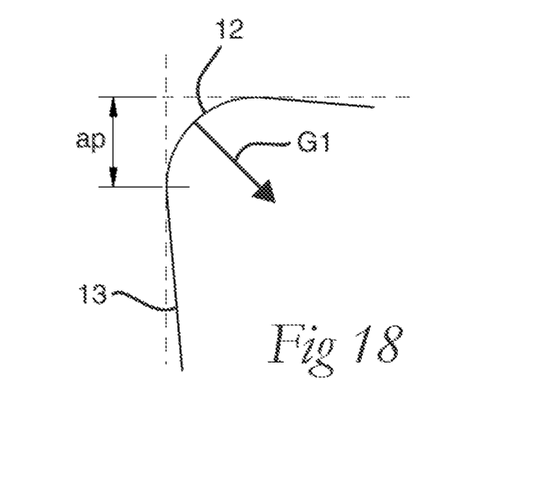
FIG. 18 is a schematic picture showing the chip flow direction in FIG. 17.

In FIGS. 17 and 18, fine turning is illustrated, in which the cutting depth $a_p$ is minimal. If it is assumed that the corner radius of the turning insert amounts to 0.8 mm, also the cutting depth $a_p$ in the example amounts to 0.8 mm, i.e., the corner radius and the cutting depth are equally large. Therefore, all chip removal takes place by means of the corner radius, while the main edge 13 is inactive. In fine turning, usually a moderate feed is selected. This means that the generated chip CH becomes thin and slender. Immediately after the removal from the workpiece, the chip moves in the direction of arrow G1 (see FIG. 18), i.e., straight rearward in the direction of the aforementioned bisector B. Because the chip is thin and slender, the same becomes easily bendable (cf. the blade of grass). Thanks to its bendability, the chip can without problems dive down into the fairly deep valley in the section XII-XII (see FIG. 12) and hit the primary flank surface 21 very quickly after the moment of removal. This means that the thin chip is bent about in the ideal way that is shown in FIG. 4. When the chip has passed the primary flank surface, the same is curled and broken into pieces against itself. By the oval knob having its length extension transversely in relation to the bisector, the chip will hit the primary flank surface 21 with great reliability even if the chip flow direction would deviate somewhat from the bisector.

Figure 19:
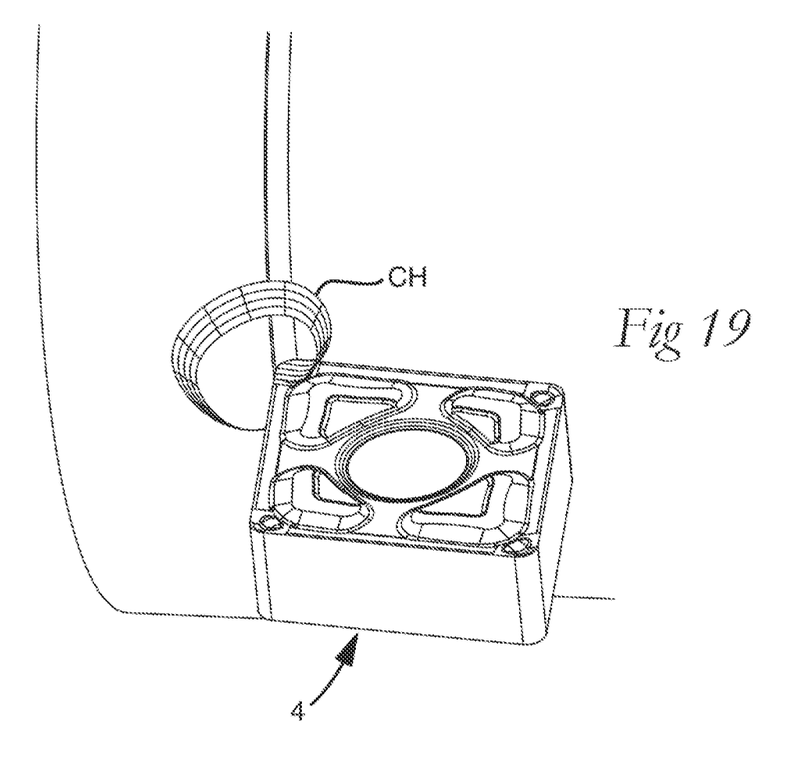
FIGS. 19-22 are pictures corresponding to FIGS. 17 and 18 showing the chip formation at two additional, greater cutting depths.
Figure 20:
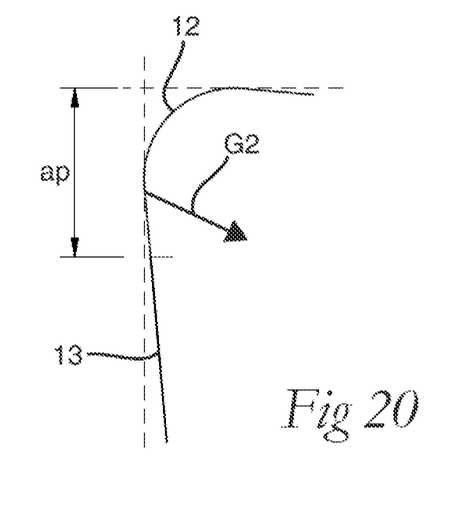

In FIGS. 19-20, the turning insert is shown during medium turning. Here, the cutting depth $a_p$ is greater than the cutting depth of the first case, more precisely approximately twice as large (=1.6 mm). In medium turning, usually also the feed is increased. This means that the chip becomes wider and thicker than the chip in FIG. 17. Simultaneously, the chip flow direction G2 is altered because the chip is removed not only by the arched nose edge 12 but also by a portion of the connecting, straight main edge 13. This means that the chip will hit the flat side portion of the knob 20 (see FIG. 15), as well as the front breast surface 17 on the land 6. The angle of inclination of this breast surface 17 (not shown) is approximately as large as $\alpha_4$ according to FIG. 15. Also in medium turning according to FIGS. 19-20, the chip CH curls, but in this case the same is guided sideward so as to hit a clearance surface 9 and be broken into pieces against the same.

Figure 21:
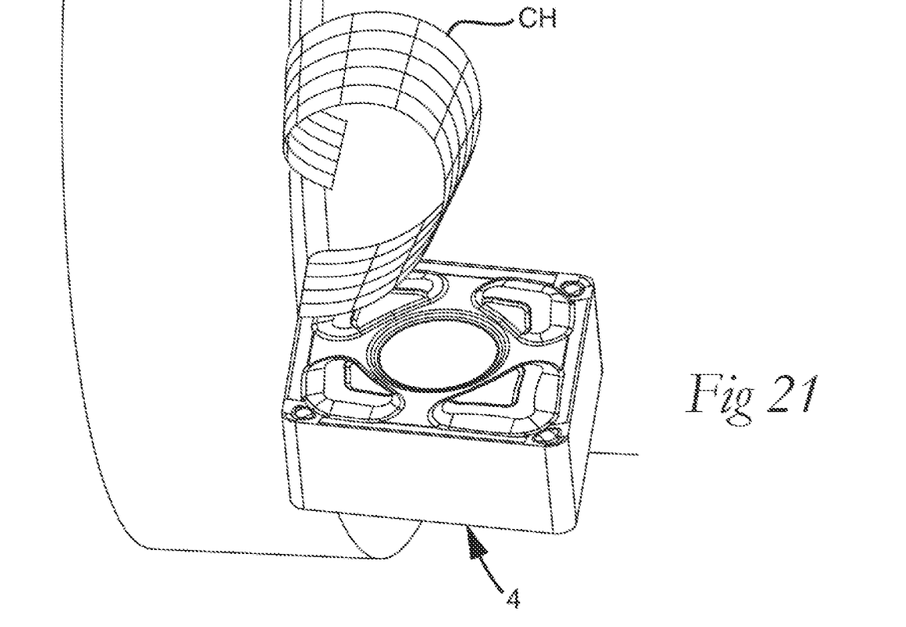
Figure 22:
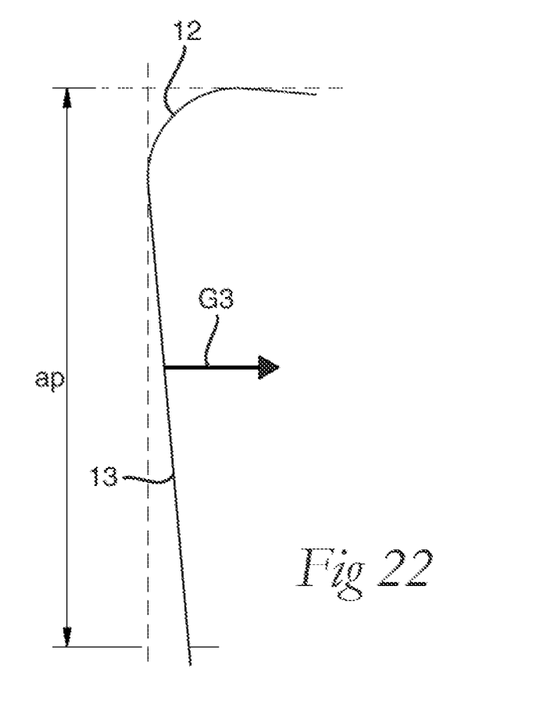

In FIGS. 21-22, rough turning is shown with a cutting depth $a_p$, which is considerably greater than the previously exemplified cutting depths. In the example, the cutting depth $a_p$ is assumed to amount to 5 mm. In this case, the chip flow direction G3 has been altered, so that the same is almost perpendicular to the main edge 13. In addition, the feed may be fairly high. This means that the chip CH becomes considerably thicker and stiffer (cf. the reed straw) than the previously shown chips. In order for such a relatively stiff chip to not dive into the flank surface in question with a great force and high heat generation (cf. FIG. 3), the same should hit flank surfaces that lean moderately. The shown embodiment of the turning insert provides that the major part of the chip CH (according to FIG. 21) will hit the flank and breast surfaces 16, 17 on one side of the land 6 at the same time as the knob 20, thanks to its flat shape along the side, and affords a carefully acting target area for the portion of the chip surface that hits the knob.

From what has been said above, it should be clear that the described turning insert affords an optimum chip control not only for thin chips in fine turning, but also for any cutting depths. Accordingly, the primary flank surface of the knob can afford an efficient chip control for slender and easily bent chips, without the knob impairing or disturbing the chip control, when the width and stiffness of the chip increase.

In this connection, it should be pointed out that the chip width is not necessarily constant. Accordingly, the chip width may—if the surface of the workpiece is uneven—vary intermittently during one and the same turning operation.

Although the knob made in accordance with the invention and its primary flank surface have been described above only in the context of the pointed corners J1, J2, analogous knobs are also arranged in the obtuse corners J3, J4. Although the behind lands 6 here have an more open V-shape than the previously described ones, the knobs in the obtuse corners work in the same way as the previously described ones at the pointed corners.

The invention is not limited only to the preferred embodiments of turning insert described above and shown in the drawings. Although the turning insert in the preferred embodiment is double-sided, i.e., includes identical upper and under sides, the same may also be made single-sided, i.e., with one or more cutting edges only in the upper side. Furthermore, the turning insert may be made without centre hole so as to be clamped in the tool by other means than exactly a screw. Furthermore, it should be pointed out that the described, primary flank surface has not necessarily to be formed on a solitary knob separated from a land behind. Accordingly, the land, which includes two secondary flank surfaces for the main edges of the turning insert, may be narrowed and extended in the forward direction toward the nose and be formed with the primary flank surface on the extension. It will be appreciated by those skilled in the art that additions, deletions, modifications, and substitutions not specifically described may be made without department from the spirit and scope of the invention as defined in the appended claims.

What is claimed is:

1. Polygonal turning insert comprising:
   an upper side generally parallel to a reference plane;
   an under side,
   a plurality of clearance surfaces between the upper side and the under side;
   a cutting edge that is formed at least along the upper side and includes three part edges, wherein the three part edges include a nose edge situated in a corner of the insert and two main edges converging toward the corner, which individually are formed between a chip surface and a clearance surface; and
   a chip-guiding flank surface for each one of the part edges, wherein the chip-guiding flank surface includes a primary flank surface situated behind the nose edge along a bisector between the main edges and a pair of secondary flank surfaces situated inside the respective main edge,
   wherein the primary flank surface and the secondary flank surfaces lean in an upward direction from a lower boundary line,
   wherein the primary flank surface is convexly arched and delimited by an arched lower boundary line, which has an apex point facing the nose edge and is situated along the bisector and includes two mirror-symmetrical arc part lines, which extend from the apex point to a pair of opposite end points situated along a straight reference line that intersects the bisector at a right angle in a middle point between the end points,
   wherein a first distance between the midpoint and the individual end points is greater than a second distance between the midpoint and the apex point, and
   wherein an angle of inclination of the primary flank surface in arbitrary vertical sections through the midpoint decreases from a greatest value in a section along the bisector to a smallest value in a section through the individual end points.

2. Turning insert according to claim 1, wherein a greatest angle of inclination of the primary flank surface is at least twice as large as a smallest angle of inclination.

3. Turning insert according to claim 2, wherein the greatest angle of inclination of the primary flank surface is at most 50°.

4. Turning insert according to claim 2, wherein the smallest angle of inclination of the primary flank surface is at least 5°.

5. Turning insert according to claim 1, wherein the primary flank surface is convexly arched, not only in planes that are parallel to said reference plane, but also in planes that are perpendicular to the reference plane.

6. Turning insert according to claim 1, wherein the primary flank surface is included in a solitary knob, which is separated from a land in which the two secondary flank surfaces are included.

7. Turning insert according to claim 6, wherein the knob has an oval, calotte-like shape delimited not only by the primary flank surface facing the nose edge, but also by a back side being convexly arched like the same.

8. Turning insert according to claim 7, wherein an extension of the knob between said end points is at least 30% greater in length than an extension of the knob along the bisector.

9. Turning insert according to claim 1, wherein a rake angle between the chip surface and a reference plane parallel to the upper side successively decreases from a greatest value along the bisector to a smallest value in a section along the transverse reference line, and wherein an obtuse valley angle between the primary flank surface and the surrounding chip surface increases from a smallest value in a section along the bisector to a greatest value in a section along said reference line.

10. Turning insert according to claim 9, wherein the obtuse valley angle increase proportionally more than only by the increase caused by the successive decrease of the angle of inclination of the primary flank surface.

11. Turning insert according to claim 6, wherein the knob is situated under an imaginary plane, in which the cutting edge line of the turning insert is located 12. Turning insert according to claim 6, wherein a rake angle between the chip surface and a reference plane parallel to the upper side successively decreases from a greatest value along the bisector to a smallest value in a section along the transverse reference line, and wherein an obtuse valley angle between the primary flank surface and the surrounding chip surface increases from a smallest value in a section along the bisector to a greatest value in a section along said reference line.

13. Turning insert according to claim 12, wherein the obtuse valley angle increase proportionally more than only by the increase caused by the successive decrease of the angle of inclination of the primary flank surface.

14. Turning insert according to claim 12, wherein the knob is situated under an imaginary plane, in which the cutting edge line of the turning insert is located.

* * * * *